United States Patent [19]
Litington

[11] 4,383,728
[45] May 17, 1983

[54] CARBON COATED INFRA RED REFLECTORS

[75] Inventor: Alan H. Litington, Worcester, England

[73] Assignee: National Research Development Corporation, London, England

[21] Appl. No.: 206,898

[22] Filed: Nov. 14, 1980

[30] Foreign Application Priority Data

Nov. 20, 1979 [GB] United Kingdom ................ 7940014

[51] Int. Cl.³ ............................ G02B 1/04; G02B 5/08
[52] U.S. Cl. ........................................ 350/1.7; 350/1.6
[58] Field of Search ................... 350/1.7, 1.6, 288

[56] References Cited
U.S. PATENT DOCUMENTS 2,854,349  9/1958  Dreyfus et al. ...................... 350/1.7
2,907,672  10/1959  Irland et al. ......................... 350/1.7
4,330,183  5/1982  Kastner ............................... 350/288

Primary Examiner—Jon W. Henry
Attorney, Agent, or Firm—Cushman, Darby & Cushman

[57] ABSTRACT

Reflectors of infra red radiation are used in infra red (thermal) imager systems to scan and reflect thermal radiation onto detectors. In this invention the highly reflecting surfaces of the reflectors, e.g. mirrors and rotating prisms, are coated with a thin infra red transparent layer of glassy diamond-like carbon. The carbon layer may be formed directly on the surface or an initial thin bonding layer, e.g. of silicon or germanium, may be deposited on the reflecting surface followed by the carbon layer. Both the bonding layer and carbon layer may be deposited by a glow discharge technique.

9 Claims, 3 Drawing Figures

CARBON COATED INFRA RED REFLECTORS

This invention relates to infra red (IR) reflectors or mirrors.

Such reflectors are used in thermal imaging systems to sweep and reflect an image of a scene onto IR detectors. For maximum sensitivity, and hence range of observable scene, in thermal imagers it is essential that all reflecting surfaces reflect as much infra red as possible. A thin layer of silver when deposited provides a good reflector but unfortunately soon tarnishes and its reflective efficiency drops drastically. Another good reflective material is aluminium but again this tarnishes through surface oxidisation.

One way of overcoming oxidisation is to coat the aluminium with a 0.15 μm thick layer of silicon oxide. This has a high reflectivity at near normal angles of incidence but a greatly reduced reflectivity at angles of incidence greater than about 40°, making SiO unsuitable for coating reflectors on thermal imagers.

According to this invention an infra red reflector comprises a substrate having a highly reflective surface covered with a thin layer of infra red transmitting glassy diamond like carbon.

The carbon layer may be deposited direct onto the reflector or onto a thin layer of infra red transmitting material, such as silicon or germanium, deposited on the reflecting surface.

The reflecting surface may be a layer of reflecting material such as silver, aluminium, copper, or gold etc., deposited on a substrate of metal, glass or plastics material. Alternatively the reflecting surface may be the highly polished surface of an aluminium etc. substrate.

The invention will now be described by way of example only, with reference to the accompanying drawings of which:

Figure 1:
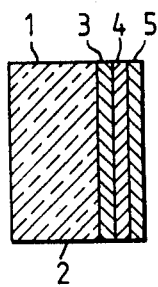
FIG. 1 is a cross section of a mirror.

As seen in FIG. 1 an infra red reflector comprises a substrate 1 of glass which has a surface 2 cleaned and polished. Onto this cleaned surface 2 a thin layer of nickel chrome is evaporated followed by a layer 3 of aluminium in a well known manner typically to a thickness of 0.3 μm. A thin layer 4, e.g. 0.1 μm thick, of silicon or germanium is deposited onto the aluminium layer 3 to provide a good bond to the aluminium 3 and to a thin layer 5 of diamond like carbon having a thickness of 0.15 to 0.5 μm.

Alternatively the carbon layer 5 may be deposited direct onto the aluminium layer 3.

Both the layer 5 and 4 (if used) are substantially transparent to infra red radiation. The layer should be as thin as possible consistent with adequate physical protection. For example the layer 5 may be less than 0.5 μm providing no pin holes exist. However, to resist abrasion the carbon layer 5 may be thicker although too thick a layer will result in a high infra red absorption.

Figure 2:
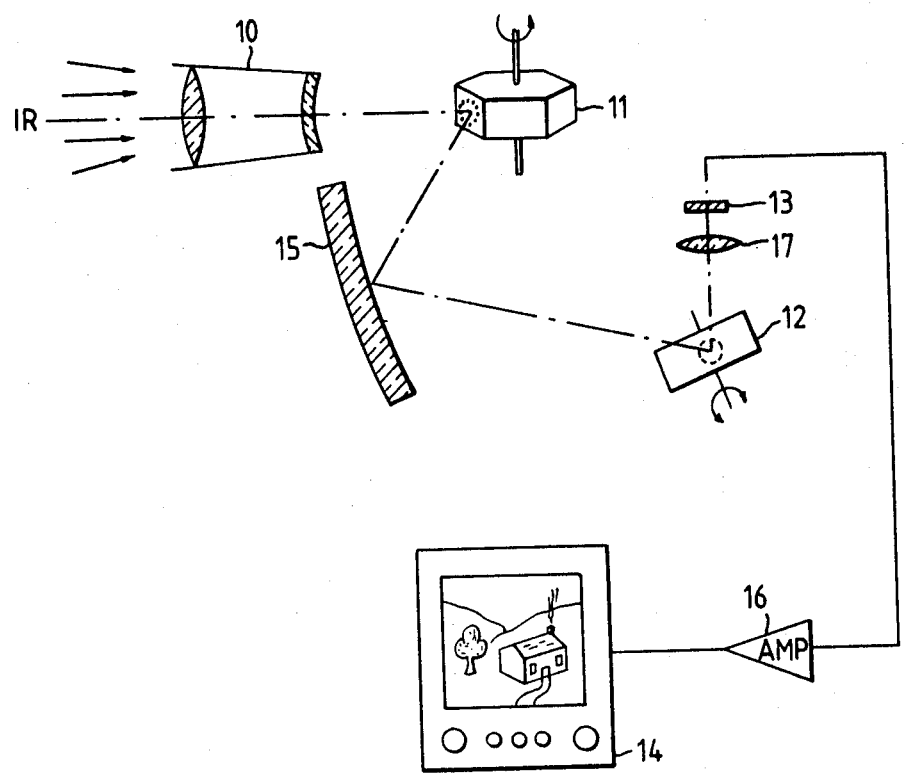
FIG. 2 is a schematic view of a thermal imaging system.

FIG. 2 shows, schematically, a known thermal imager system comprising a telescope 10 having germanium lens 1 focussing the thermal image of a scene onto a rotating multi-faced drum 11 which causes a horizontal scan. From the drum 11 the IR is reflected onto a concave strip mirror 15 and onto a flapping mirror 12 which provides a vertical scan. From the flapping mirror 12 infra red is reflected through a lens 17 onto a detector array 13 whose output forms a signal which is applied in an amplifier 16 and then used to display the thermal image of the scene onto the screen of a television monitor 14.

From FIG. 2 it is clear that the drum must be highly reflecting, at all angles of incidence. The tables 1-4 below give details of reflectivity for various surfaces at different wavelengths. In the tables:

$R_s$ is co-efficient of reflectivity perpendicular to the plane of incidence;

$R_p$ is co-efficient of reflectivity parallel to the plane of incidence;

0°, 45°, 60° are angles of incidence.

TABLE 1

Reflector aluminium (untarnished)

| Wavelength (μm) | 0 $R_{s,p}$ | AL 45° $R_s$ | AL 45° $R_p$ | AL 60° $R_s$ | AL 60° $R_p$ |
|---|---|---|---|---|---|
| 3 | 96.8 | 97.8 | 95.6 | 98.4 | 93.8 |
| 3.5 | 97.0 | 97.9 | 95.8 | 98.5 | 94.2 |
| 4.0 | 97.5 | 98.2 | 96.5 | 98.7 | 95.1 |
| 4.5 | 97.4 | 98.2 | 96.4 | 98.7 | 94.9 |
| 5.0 | 97.5 | 98.2 | 96.5 | 98.7 | 95.1 |
| 8.0 | 97.9 | 98.5 | 97.1 | 99.0 | 95.9 |
| 8.6 | 97.9 | 98.5 | 97.1 | 99.0 | 95.9 |
| 9.0 | 97.9 | 98.5 | 97.1 | 99.0 | 95.9 |
| 9.6 | 98.0 | 98.6 | 97.2 | 99.0 | 96.1 |
| 10.0 | 98.0 | 98.6 | 97.2 | 99.0 | 96.1 |
| 11.0 | 98.1 | 98.7 | 97.3 | 99.0 | 96.2 |
| 12.0 | 98.2 | 98.7 | 97.4 | 99.1 | 96.4 |
| 13.0 | 98.3 | 98.8 | 97.6 | 99.1 | 96.6 |
| 14.0 | 98.3 | 98.8 | 97.7 | 99.2 | 96.7 |

TABLE 2

Reflector aluminium coated with SiO to a thickness of 0.15 μm

| Wavelength (μm) | 0 $R_{s,p}$ | AL + SiO(t = 0.15 μm) 45° $R_p$ | AL + SiO(t = 0.15 μm) 45° $R_p$ | AL + SiO(t = 0.15 μm) 60° $R_s$ | AL + SiO(t = 0.15 μm) 60° $R_p$ |
|---|---|---|---|---|---|
| 8.0 | 97.9 | 98.5 | 97.0 | 98.9 | 95.9 |
| 8.6 | 97.8 | 98.4 | 77.2 | 98.9 | 59.0 |
| 9.0 | 97.7 | 98.4 | 78.0 | 98.8 | 61.0 |
| 9.6 | 97.5 | 98.2 | 88.8 | 98.7 | 80.1 |
| 10.0 | 97.2 | 98.0 | 91.9 | 98.6 | 86.2 |
| 11.0 | 97.7 | 98.4 | 96.0 | 98.8 | 93.9 |
| 12.0 | 98.1 | 98.6 | 96.6 | 99.0 | 94.8 |

TABLE 3

Reflector aluminium coated with carbon to a thickness of 0.5 μm.

| Wavelength (μm) | 0 $R_{s,p}$ | AL + C(t = 0.5μ) 45° $R_s$ | AL + C(t = 0.5μ) 45° $R_p$ | AL + C(t = 0.5μ) 60° $R_s$ | AL + C(t = 0.5μ) 60° $R_p$ |
|---|---|---|---|---|---|
| 8.0 | 93.1 | 94.9 | 91.7 | 96.3 | 90.7 |
| 8.6 | 94.1 | 95.7 | 92.5 | 96.9 | 91.3 |
| 9.0 | 94.6 | 96.1 | 93.0 | 97.2 | 91.6 |
| 9.6 | 95.3 | 96.6 | 93.6 | 97.5 | 92.1 |
| 10.0 | 95.6 | 96.8 | 93.9 | 97.7 | 92.3 |
| 11.0 | 96.2 | 97.3 | 94.6 | 98.1 | 92.9 |
| 12.0 | 96.7 | 97.6 | 95.0 | 98.3 | 93.4 |
| 13.0 | 97.1 | 97.9 | 95.5 | 98.5 | 93.8 |
| 14.0 | 97.4 | 98.1 | 95.8 | 98.7 | 94.1 |

TABLE 4

Reflector aluminium coated with carbon to a thickness of 0.15 μm

| Wavelength (μm) | 0 $R_{s,p}$ | AL + C(t = 0.15 μm) | | | |
|---|---|---|---|---|---|
| | | 45° | | 60° | |
| | | $R_s$ | $R_p$ | $R_s$ | $R_p$ |
| 3 | 93.9 | 95.6 | 92.3 | 96.8 | 91.0 |
| 3.5 | 95.1 | 96.5 | 93.6 | 97.5 | 92.0 |
| 4.0 | 96.3 | 97.4 | 94.9 | 98.1 | 93.4 |
| 4.5 | 96.5 | 97.5 | 95.1 | 98.2 | 93.5 |
| 5.0 | 96.3 | 97.7 | 95.4 | 98.4 | 93.8 |
| 8.0 | 97.7 | 98.4 | 96.6 | 98.8 | 95.1 |
| 8.6 | 97.7 | 98.4 | 96.6 | 98.9 | 95.2 |
| 9.0 | 97.8 | 98.4 | 96.7 | 98.9 | 95.2 |
| 9.6 | 97.9 | 98.5 | 96.8 | 98.9 | 95.4 |
| 10.0 | 97.9 | 98.5 | 96.8 | 98.9 | 95.4 |
| 11.0 | 98.0 | 98.6 | 97.0 | 99.0 | 95.6 |
| 12.0 | 98.1 | 98.6 | 97.1 | 99.0 | 95.8 |
| 13.0 | 98.2 | 98.7 | 97.2 | 99.1 | 96.0 |
| 14.0 | 98.3 | 98.8 | 97.3 | 99.1 | 96.2 |

Figure 3:
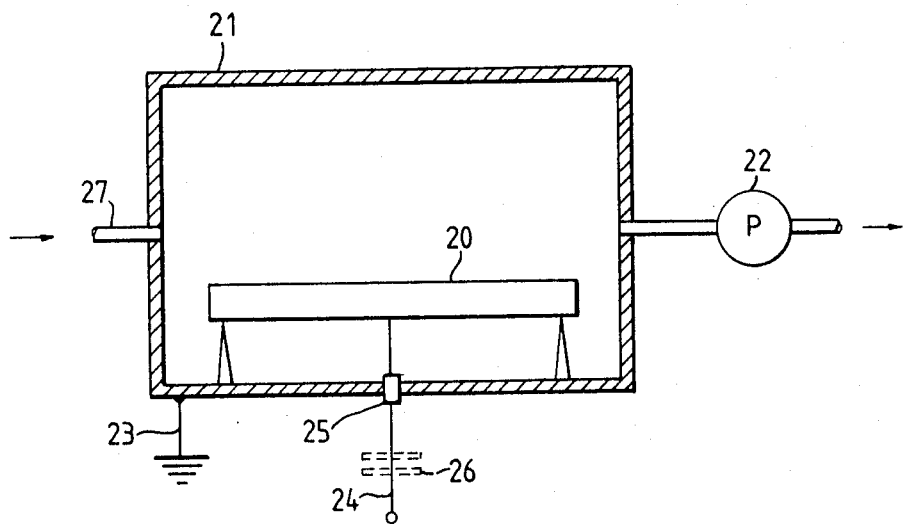
FIG. 3 is a sectional view of apparatus for depositing a carbon, or silicon, or germanium, layer on a reflecting surface.

Apparatus for coating the aluminium layer 3 is shown in FIG. 3. The specimen to be coated (i.e. the substrate 1 and layer 3) is placed in an air tight metal container 21 which is then evacuated by a vacuum pump 22 to about $10^{-5}$ Torr. A gas such as methane, or propane is continuously bled into the container 21 through an inlet pipe 27 and the pressure maintained at about 10 Torr by throttling the pump 22 and the gas inlet pipe 27. Metal parts of the container 21 are connected to earth 23 whilst the specimen 20 is connected 24 through an insulated connector 25 to a −700 volts D.C. supply. As a result ionisation of the gas takes place with a consequential dissociation of hydrogen and carbon atoms. Carbon atoms impinge onto the heated specimen 20 to form a layer having a time dependent thickness. For example a 0.5 μm thick layer is formed in about 25 minutes.

As an alternative to D.C glow discharge RF flow discharge may be used. In this technique the D.C. supply of FIG. 3 is replaced by an RF supply at 13 MHz frequency supplied through a capacitor 26 developing a cathode potential of about −700 volts. Operating conditions are as for D.C. operation.

Carbon deposited as above forms an abrasion resistant, chemically durable layer similar to that found in diamonds and is substantially transparent to infra red radiation, i.e. the wavelengths between about 3 to 14 μm. The soft form of carbon such as graphite is not suitable.

Deposition of hard carbon and its properties is described in for example Thin Solid Films 58 (1979) 101–105; 107–116; and 117–120 together with references (papers read at the Fourth International Congress on Thin Films, Loughborough, Great Britain, Sept. 11-15 1978).

To deposit the layer 4 of silicon or germanium onto the layer 3 the apparatus of FIG. 3 is used in a manner similar to that for depositing carbon. However, the gas used is silane ($SiH_4$) for depositing silicon, and germane ($GeH_4$) for depositing germanium.

A layer of about 1000 Å is deposited. Alternatively the layers of germanium and silicon may be deposited using conventional techniques, such as RF sputtering, in a separate process.

I claim:

1. An infra red reflector comprising a substrate having a highly reflecting surface covered with a thin layer of glassy carbon that is substantially transparent to infra red radiation, with a high abrasion resistance and chemical durability.

2. A reflector according to claim 1 wherein the carbon layer is deposited directly onto the reflecting surface.

3. A reflector according to claim 1 wherein a thin bonding layer of infra red transmitting material is arranged between the reflecting surface and the carbon layer.

4. A reflector according to claim 3 wherein the bonding layer is a layer of silicon.

5. A reflector according to claim 3 wherein the bonding layer is a layer of germanium.

6. A reflector according to claim 1 wherein the highly reflecting surface is formed by a coating on the substrate surface.

7. A reflector according to claim 6 wherein the coating is a layer of silver.

8. A reflector according to claim 6 wherein the coating is a layer of aluminium.

9. A reflector according to claim 1 wherein the substrate comprises a multifaces drum arranged for rotation about an axis for scanning an infra red image.

* * * * *